United States Patent [19]

Altmann

[11] 3,795,764

[45] Mar. 5, 1974

[54] TELEVISION RECEIVER WITH AN AUDIO SECTION CONSTRUCTED TO AUTOMATICALLY RECEIVE TWO CHANNEL AND STEREOPHONIC SIGNALS

[75] Inventor: Albrecht Altmann, Sibbesse, Germany

[73] Assignee: Blaupunkt-Werke GmbH, Hildesheim, Germany

[22] Filed: Sept. 13, 1972

[21] Appl. No.: 288,787

[30] Foreign Application Priority Data

Sept. 14, 1971 Germany .......................... 2145803

[52] U.S. Cl. ............ 178/5.8 R, 179/15 BT, 325/36

[51] Int. Cl. .............................................. H04n 5/60

[58] Field of Search .......... 178/5.6, 5.8 R, DIG. 23; 325/36, 101, 103, 315, 316, 47; 179/15 BT

[56] References Cited

UNITED STATES PATENTS

| | | | |
|---|---|---|---|
| 3,221,098 | 11/1965 | Feldman et al. | 178/5.8 R |
| 2,982,813 | 5/1961 | Hathaway | 178/5.6 |

OTHER PUBLICATIONS

"A Television Facsimile System," Dr. S. Soejima, Japan Electronic Engineering, No. 48, Nov. 1970, pp. 24–31.

"Sound–Multiplex Television Receiver," Goro Suzuki, Toshiba Review, No. 46, Jan.–Feb. 1970, pp. 7–12.

*Primary Examiner*—Howard W. Britton
*Assistant Examiner*—George G. Stellar
*Attorney, Agent, or Firm*—Flynn & Frishauf

[57] ABSTRACT

A first audio channel is generated at a predetermined frequency; a second audio channel is generated at a first frequency which is the predetermined frequency plus a first odd multiple of half the line frequency of the television signal; a second audio channel is generated at a second frequency which is the predetermined frequency plus a second odd multiple of half of the line frequency, the difference between the first and second frequency being summed with respect to the predetermined frequency; in the receiver the predetermined frequency and the mean between the first and second frequencies are discriminated and decoded in a third discriminator tuned to the difference frequency between the predetermined frequency and substantially the mean between the first and second frequencies, and a characteristic voltage is derived from the third discriminator representative of whether the first or second, or first or third frequencies are received by the receiver to energize audio circuits accordingly.

7 Claims, 2 Drawing Figures

Figure 1:
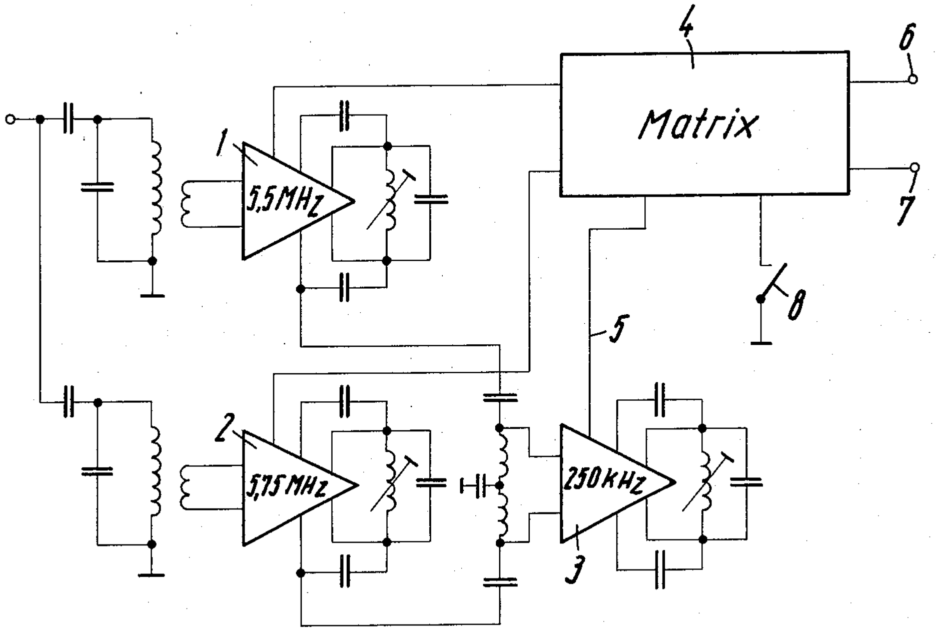

TELEVISION RECEIVER WITH AN AUDIO SECTION CONSTRUCTED TO AUTOMATICALLY RECEIVE TWO CHANNEL AND STEREOPHONIC SIGNALS

The present invention relates to a method of broadcasting two television audio signals for two channel and stereo operation. A first one of the channels may be termed the normal or regular channel, and the second channel may be termed the auxiliary channel. The invention also relates to a receiver to carry out the method.

It has previously been proposed to provide two audio carriers for three different modes of operation. In the first mode, only a single audio carrier is used, and only a single audio program is being radiated or broadcast, and received. In a second mode, two audio carriers are used in which the first audio carrier radiates program No. 1 and the second audio carrier, a program No. 2. Such a transmission may be used, for example, for synchronous transmission in two languages. The third mode operation is audio with stereo transmission, the first carrier radiating the sum signal R+L and the second carrier the difference signal L−R.

It is necessary to characterize the mode of transmission. Thus, it is necessary that the audio receiver, that is, the television (TV) receiver have available an identifying signal which identifies the mode of transmission so that the receiver may, automatically, switch to the specific mode of signal being received.

It has previously been proposed to transmit a second pilot frequency in the second audio channel, which is additional to the audio information itself, and which distinguishes between two channel operation (for example, in two languages) and stereo operation. This requires comparatively expensive filter arrangements in the receiver in order to filter out the additional pilot frequencies. In accordance with a different proposal, the characterization of the mode of transmission is effected by an amplitude modulated auxiliary carrier. The auxiliary carrier, upon two channel operation, is modulated with a first frequency, for example, 922.5 Hz and, in stereo operation, is modulated with a different frequency (982.5 Hz). The auxiliary carrier frequency is 3½ times the line frequency and modulation is 70 percent. This system also requires expensive and carefully adjusted filters and decoded networks in the receiver.

It is an object of the present invention to provide a broadcasting method and system in which the mode of transmission can easily be decoding in the receiver.

SUBJECT MATTER OF THE PRESENT INVENTION

Briefly, the frequency of the audio carrier, for the second channel, is selected such that it is slightly different in the second channel in stereo operation from the frequency of the second channel in two channel operation. This system and method permits reliable and unambiguous characterization of the mode of operation without requiring additional pilot frequencies or auxiliary carriers. It is also possible to provide for additional multiplex modulation of the second audio carrier.

The system and method of the invention has the further advantage that a television receiver can be constructed simply and easily without utilizing expensive or complicated filters and decoding circuits. A first discriminator is provided for a first audio channel, a second discriminator for a second audio channel, and a third discriminator as the frequencies of the first and the second audio channel applied thereto and is tuned to their difference, the third discriminator then providing a switching voltage which is different in stereo operation and in two channel operation, the different voltages characterizing the mode of broadcasting. This switching voltage can then additionally be utilized to automatically switch over the mode of the receiver.

Figure 2:
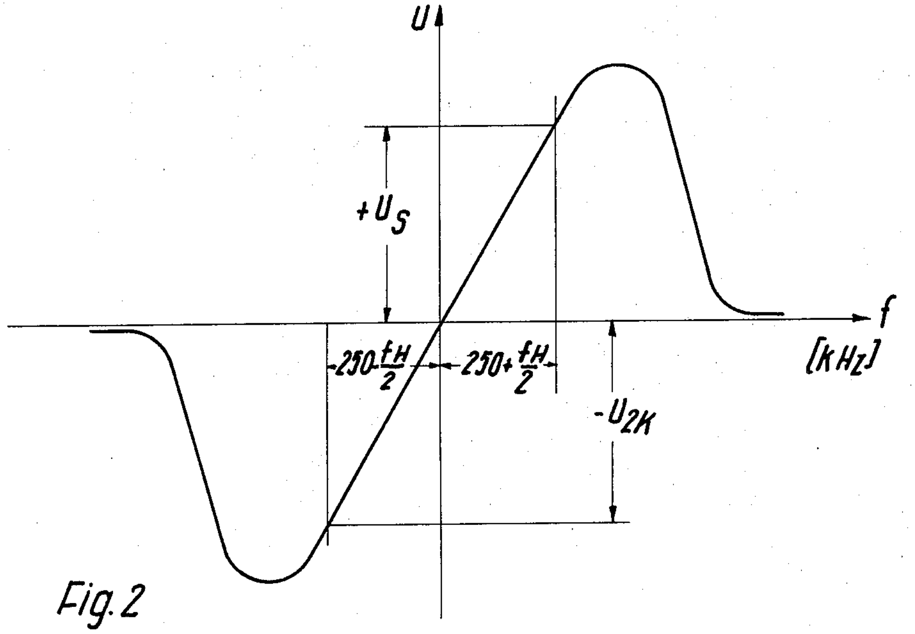

The invention will be described by way of example with reference to the accompanying drawings, wherein:

FIG. 1 is a highly schematic circuit diagram of a two channel receiver and FIG. 2 illustrates the voltage relationships arising on the third discriminator of the circuit in accordance with FIG. 1.

Under normal operating conditions, the first audio carrier is placed at about 5.5 MHz. The second audio carrier is then placed at a frequency of 5.5 MHz increased by an odd multiple of half the line frequency $f_h$. It is advantageous, for example, to select for the second audio carrier a frequency of $5.5\ \text{MHz} + 31 \cdot (f_h/2) = 5.743\ \text{MHz}$. In accordance with the invention, a simple characterization can be obtained by selecting the frequency of the second audio carrier to be different by a whole multiple of half the line frequency when in stereo operation. Thus, in ordinary two channel operation, the second audio carrier is placed at the previously referred to frequency of 5.743 MHz. in stereo operation, however, the multiplication factor of half the line frequency is selected to be different by a whole multiple, for example, in stereo operation the frequency of the second audio carrier will be:

$$5.5\ \text{MHz} + 33 \cdot (f_h/2) = 5.759\ \text{MHz}$$

The half line offset between the two modes of operation is advantageous to reduce interference problems. The audio de-modulator is then, preferably, tuned to an average or medium or mean frequency of 5.75 MHz, the deviation of exact tuning and the particular frequency being radiated not causing any difficulties.

Television receivers to receive the two television audio channels with the specific characterization for two channel or stereo operation, respectively, can be constructed simply and with low component requirements.

Two audio demodulators 1, 2, are utilized (as known). The first audio demodulator 1 is tuned to a center frequency of 5.5 MHz. The second audio demodulator is tuned to a center frequency of 5.75 MHz. The two audio demodulators can be made as integrated circuits. They preferably include a limiting amplifier. They limit and amplify the frequencies of the first audio channel 5.5 MHz, and of the second audio channel which may be 5.743 MHz in two-channel operation or 5.759 MHz in stereo operation. The limited and amplified frequency signals of the first audio channel and of the second audio channel, at their respective frequencies, are applied to a third audio demodulator 3 which is tuned to a center frequency of 250 kHz. This frequency corresponds to the difference frequency of the center frequencies of the audio demodulators 1 and 2. The low frequency signals from the audio demodulators 1 and 2, of the two channels are applied to a matrix or connecting circuit 4 which is connected, further, to an output terminal 5 (having a d-c voltage thereat) of the third demodulator 3. The outputs 6, 7 of the matrix 4 then have, depending upon operator mode, single channel, two channel different, or stereo signals at their terminals. In single channel operation, only the first demodulator 1 is operative, since only the first audio carrier at 5.5 MHz is present. No difference frequency arises in the third audio modulator, so that it will be ineffective and there will be no output signal. In two channel or stereo operation, however, the second audio carrier is also present. In two channel operation it is, as previously calculated, at 5.743 MHz, whereas for stereo operation it is at 5.759 MHz. The small deviation of $\pm f_h/2$ from the center frequency of the second demodulator 2 does not, in practical effect, cause any degradation of the demodulator characteristics. When both audio carriers are present, that is, in mode two or mode three, the third audio demodulator 3 provides a difference frequency. In two channel operation, the difference frequency will be 250 kHz $-$ $(f_h/2)$ ; in stereo operation the difference frequency will be 250 kHz $+$ $(f_h/2)$ . Thus, there will be two different d-c output voltages 5 at the third demodulator 3. The difference in these output voltages is utilized to switch the matrix or switching circuit 4. In two channel operation, the output voltage will be a negative voltage of $-U_{2K}$, whereas in stereo operation, a positive voltage of $+U_S$ is available (see FIG. 2). Thus, the receiver can be easily, automatically switched over depending on mode of transmission.

A switch 8 is further provided which controls the reproduction of only one channel in two channel transmission. This switch 8 may, also, be a transfer switch to connect either terminal 6 or 7 to a common output terminal or both, to a stereo set, as desired.

It will be understood that audio carriers in the 5 to 6 MHz range are the carriers as they are detected in the receiver and that it is immaterial for reception whether a corresponding audio subcarrier is modulated on to the picture audio at the transmitting station or whether, as is more common, a v.h.f. audio carrier for each audio channel is radiated at the television transmitter with a frequency spacing in the 5 to 6 MHz range of a value as above described. The 5 to 6 MHz audio carrier, in the detection of which the picture carrier participates, as is well known, may therefore more strictly be referred to as a subcarrier.

Various changes and modifications may be made within the inventive concept.

For line frequency standards having a line frequency of 15.750 kHz the following relationships, for example, would be suitable:

first or base carrier frequency:
second frequency: $4.5 + 31\,f/2 = 4.744$ MHz
third frequency: $4.5 + 33\,f/2 = 4.759$ MHz
tuning of discriminator 2: 4.752 MHz
tuning of discriminator 3: 252 kHz

I claim:

1. A method of receiving broadcast television signals including video signals and two audio signals, selectively in two different modes, comprising:

demodulating said picture and audio carriers to obtain a video signal and two audio channel signals together with the two audio subcarriers, including a first audio subcarrier having a first predetermined frequency and a second audio subcarrier having either a second predetermined frequency or a third predetermined frequency;

comparing the frequency of said second audio subcarrier with the frequency of said first audio subcarrier to produce the difference frequency between said frequencies;

subjecting said difference frequency to frequency discrimination to obtain an aduio mode characterizing signal indicative of the mode in which the audio signals were transmitted, and controlling the mode of detection and reproduction of said audio channel signals in accordance with said audio mode characterizing signal.

2. A method as defined in claim 1 in which said television receiver is selectively switchable between two-channel operation and stereo operation, and in which the step of operating such selective switching is controlled by said audio mode characterizing signal.

3. A television receiver system for receiving radiated signals including a video signal modulated on a picture carrier, a first audio signal modulated on a first audio carrier of a first predetermined frequency and a second audio signal modulated on a carrier of either a second or a third predetermined frequency, the difference between said second and said third predetermined frequencies being small with respect to the difference between either said second or said third predetermined frequency and said first predetermined frequency, said receiver comprising:

first detector means for obtaining, from a receiving signal, said first and said second audio signals modulated respectively on subcarriers having respectively a fourth and either a fifth or a sixth predetermined frequencies, said fourth, fifth and sixth predetermined frequencies being respectively the differences between said first, second and third predetermined frequencies and said picture carrier frequency;

first demodulator means for said first audio signal (1) tuned to said fourth predetermined frequency;

second demodulator means for said second audio signal (2) tuned to the means between said fifth and sixth predetermined frequencies;

second detector means supplied with said subcarriers for obtaining the difference frequency between the frequencies of said subcarriers, namely the difference between either said fifth or said sixth predetermined frequencies and said fourth predetermined frequency, according to whether one of said subcarriers is at said fifth or said sixth predetermined frequency;

third demodulator means supplied with said difference frequency by said second detector means and tuned substantially to the approximate mean between the respective differences of said fourth and fifth and said fourth and sixth predetermined frequencies, said third demodulator means providing an output signal having a a characteristic voltage ($U_S$; $-U_{-2K}$) representative of whether said first and second or said first and third or only said first predetermined carrier frequencies are or is received by said receiver; and means for controlling the mode of audio reception in response to said output signal of said third demodulator means.

4. System according to claim 3 further comprising a matrix (5) having the audio signals derived from said first and second discriminators (1, 2) applied thereto, the matrix being connected to and switchable in dependence on the characteristics of the characterizing voltage.

5. System according to claim 3 wherein the first discriminator (1) is tuned to about 5.5 MHz;

the second discriminator is tuned to about 5.75 MHz;

and the third discriminator is tuned to about 250 kHz.

6. System according to claim 3 wherein the characterizing voltages are derived from said mean frequency plus or minus, respectively, the difference between the mean and said second, or third frequency, respectively.

7. System according to claim 3 wherein the first discriminator (1) is tuned to about 4.5 MHz;

the second discriminator is tuned to about 4.752 MHz;

and the third discriminator is tuned to about 252 kHz.

* * * * *